United States Patent
Pfnuer et al.

(10) Patent No.: US 9,921,378 B2
(45) Date of Patent: Mar. 20, 2018

(54) OPTICAL BENCH FOR ALIGNING AN OPTICAL DEVICE

(71) Applicant: Cisco Technology, Inc., San Jose, CA (US)

(72) Inventors: Stefan Martin Pfnuer, San Jose, CA (US); Chris Kiyoshi Togami, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 14/689,952

(22) Filed: Apr. 17, 2015

(65) Prior Publication Data
US 2016/0306118 A1    Oct. 20, 2016

(51) Int. Cl.
*G02B 6/42*     (2006.01)
*G02B 6/36*     (2006.01)
*G02B 6/32*     (2006.01)

(52) U.S. Cl.
CPC ............. *G02B 6/4231* (2013.01); *G02B 6/32* (2013.01); *G02B 6/3616* (2013.01); *G02B 6/421* (2013.01); *G02B 6/4233* (2013.01); *G02B 6/4268* (2013.01)

(58) Field of Classification Search
CPC ............................ G02B 6/421; G02B 6/4231
See application file for complete search history.

(56) References Cited

U.S. PATENT DOCUMENTS

| | | | | |
|---|---|---|---|---|
| 5,617,495 A * | 4/1997 | Funabashi | ............... | G02B 6/421 385/83 |
| 5,757,999 A * | 5/1998 | Tabuchi | ............... | G02B 6/4231 385/35 |
| 6,220,764 B1 * | 4/2001 | Kato | .................... | G02B 6/3865 264/1.25 |
| 6,222,967 B1 * | 4/2001 | Amano | .................... | G02B 6/30 385/49 |
| 6,296,400 B1 * | 10/2001 | Uchiyama | ............ | G02B 6/4292 385/92 |
| 6,470,118 B1 * | 10/2002 | Uno | ..................... | G02B 6/4204 385/49 |

(Continued)

OTHER PUBLICATIONS

U.S. Appl. No. 14/517,414, entitled Optical Transmitter With linear Arrangment and Stacked Laser Package and RF Path, filed Oct. 17, 2014.

(Continued)

*Primary Examiner* — Jerry Rahll
(74) *Attorney, Agent, or Firm* — Patterson + Sheridan, LLP

(57) ABSTRACT

An optical device may include an optical bench used align a photonic chip to a receptacle. In one embodiment, a surface of the optical bench defines an alignment plane. When a fiber stub in the receptacle is disposed on the surface, an optical path in the stub is parallel with the alignment plane. By disposing the photonic chip on the same surface, the chip and the stub can be aligned such that optical signals can be transmitted between the stub and an optical component (e.g., light source or waveguide) in the photonic chip. In one embodiment, the optical path in the stub and the optical component may have the same height relative to the optical bench. Moreover, the optical device may include a direct thermal connection between the assembly and the heat sink, and thus, have better thermal coupling relative to using thermal pads.

20 Claims, 4 Drawing Sheets

(56) References Cited

U.S. PATENT DOCUMENTS

| | | | |
|---|---|---|---|
| 6,513,993 B1* | 2/2003 | Nakanishi | G02B 6/423 385/92 |
| 6,736,554 B2* | 5/2004 | Kerboeuf | G02B 6/421 385/92 |
| 7,031,576 B2* | 4/2006 | Deane | G02B 6/4204 385/49 |
| 7,543,993 B2* | 6/2009 | Blauvelt | G02B 6/4201 385/14 |
| 2002/0172473 A1* | 11/2002 | Kerboeuf | G02B 6/4212 385/88 |
| 2002/0195611 A1* | 12/2002 | Yamabayashi | G02B 6/421 257/98 |
| 2003/0044126 A1* | 3/2003 | Kawano | G02B 6/2551 385/88 |
| 2005/0041932 A1* | 2/2005 | Benzoni | G02B 6/4201 385/88 |
| 2005/0169586 A1* | 8/2005 | Pyo | G02B 6/4246 385/92 |
| 2007/0133928 A1* | 6/2007 | Ko | G02B 6/4215 385/88 |
| 2007/0274630 A1* | 11/2007 | Ghiron | G02B 6/4231 385/33 |
| 2010/0129037 A1* | 5/2010 | Nakagawa | G02B 6/423 385/92 |
| 2013/0230285 A1* | 9/2013 | Skilnick | G02B 6/4248 385/93 |
| 2015/0125120 A1* | 5/2015 | Kurashima | G02B 6/423 385/92 |
| 2015/0370015 A1* | 12/2015 | Aoki | G02B 6/4204 385/14 |

OTHER PUBLICATIONS

U.S. Appl. No. 14/072,182, entitled Efficient Optical Communication Device, filed Nov. 5, 2013.

* cited by examiner

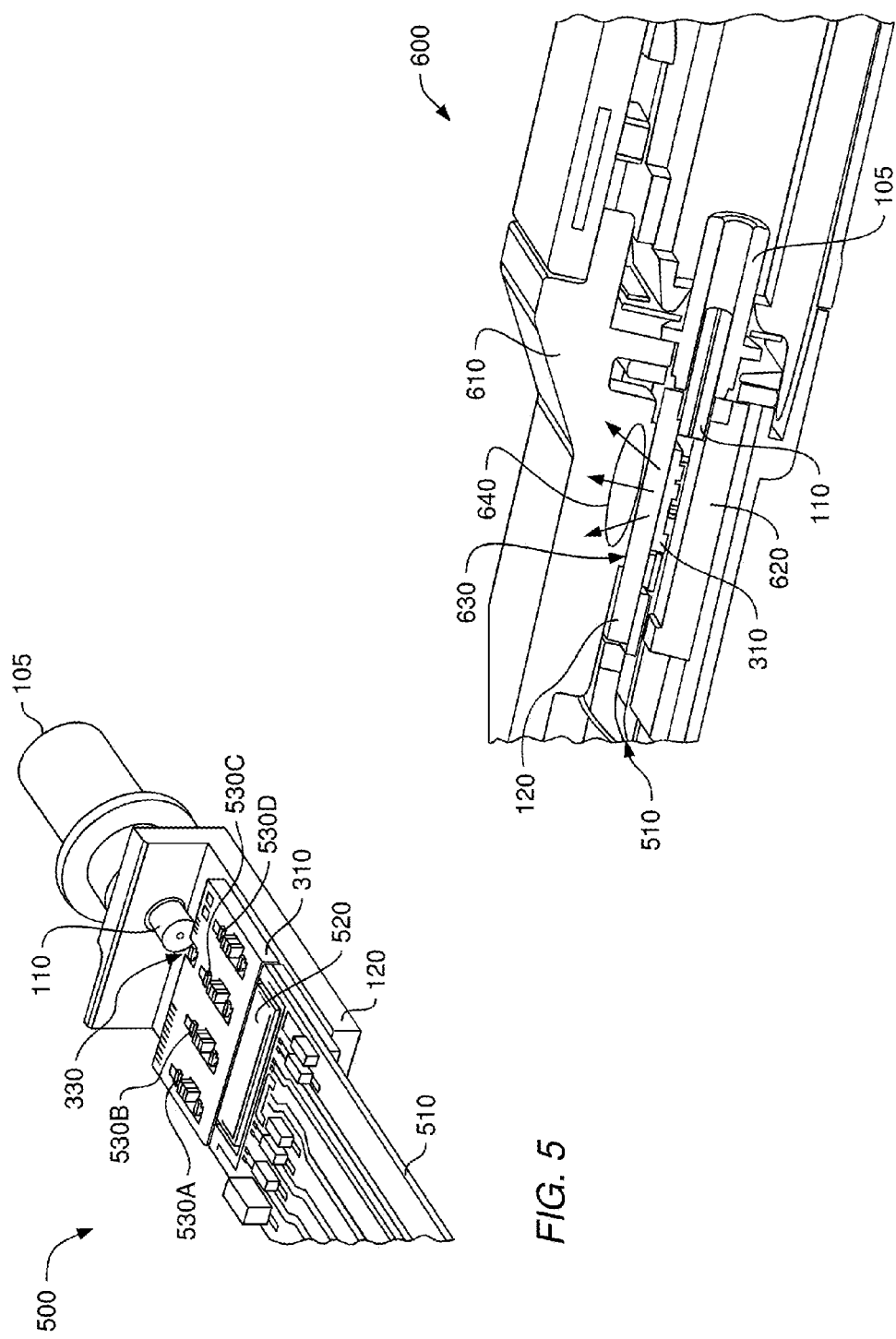

OPTICAL BENCH FOR ALIGNING AN OPTICAL DEVICE

TECHNICAL FIELD

Embodiments presented in this disclosure generally relate to aligning optical devices, and more specifically, to aligning a fiber stub to a lens on an optical chip.

BACKGROUND

Typical optical assemblies may include multiple piece parts assembled together such as a laser mounted to a submout which in turn is sitting on a cooler or within a hermetic package. At a final step, the assembly is aligned to a fiber stub in a receptacle. To absorb offset between the receptacle and the optical assembly, thermal pads may be placed between the assembly and an outside shell of a optical receiver or transmitter. In addition to providing room to align the receptacle and the optical assembly, the thermal pads also establish a thermal connection between the assembly and the shell which permits heat to be carried away from the assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is an optical transmitter that includes an optical bench, according to one embodiment described herein.

FIG. 6 is an optical transmitter with a thermal connection between the optical bench and an outer casing, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
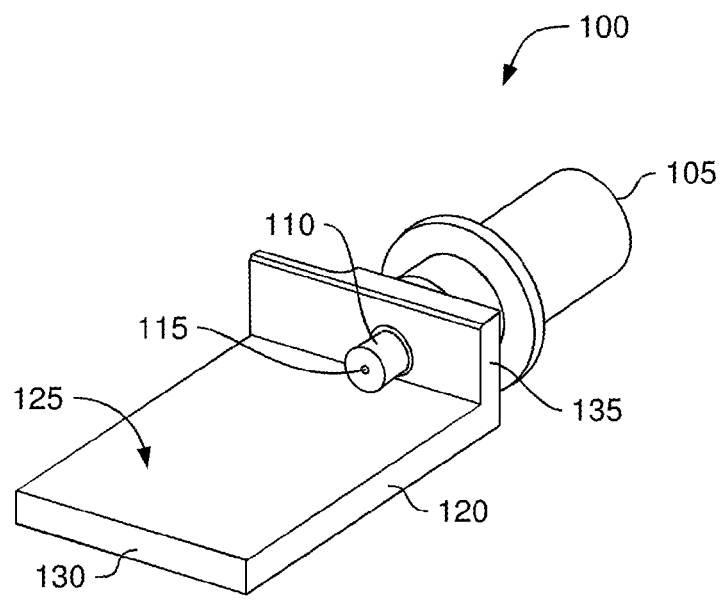
FIGS. 1A and 1B illustrate an optical bench used to align a receptacle to a photonic chip in an optical assembly, according to embodiments described herein.

One embodiment presented in this disclosure is an optical device that includes an optical bench comprising a surface defining an alignment plane and a fiber stub comprising an optical path configured to transmit an optical signal. Moreover, the fiber stub contacts the surface such that the optical path is parallel with the alignment plane. The optical device also includes a photonic chip disposed on the surface where the photonic chip includes an optical component aligned with the optical path in the fiber stub.

Another embodiment herein is a method a method that includes aligning a fiber stub to an alignment plane by disposing the fiber stub onto a surface of an optical bench, where an optical path in the fiber stub for transmitting an optical signal is parallel with the alignment plane. The method also includes disposing a photonic chip onto the surface of the optical bench such that the optical path of the fiber stub is aligned with an optical component in the photonic chip.

Another embodiment herein is an optical device that includes an optical bench comprising a surface defining an alignment plane and a fiber stub comprising an optical path configure to transmit an optical signal, where the fiber stub is in tangential contact with the surface. The optical device also includes a semiconductor chip disposed on the surface where the semiconductor chip is aligned with the optical path in the fiber stub.

Example Embodiments

Embodiments described herein include optical devices with optical benches used align an optical assembly to a receptacle without using the thermal pads mentioned above. For example, in devices where the thermal pads are used, the pads can apply unbalanced pressure onto the assembly when one pad is compressed more than the other. Such a situation may arise when the position of the assembly relative to the receptacle is offset. The unbalanced pressure can force a portion of the assembly out of alignment with other components in the optical device and reduce optical coupling. Although different materials for the thermal pads may be better at absorbing the offset between the assembly and the receptacle without applying unbalanced forces, these materials are typically poorer conductors of heat and reduce the thermal coupling between the assembly and a heat sink in the optical device. However, the techniques described herein can align an assembly to a receptacle without using the thermal pads. Moreover, the optical device may include a direct thermal connection between the assembly and the heat sink, and thus, have better thermal coupling relative to using thermal pads.

In one embodiment, a fiber stub in the receptacle is disposed on an alignment plane defined by a surface of the optical bench. The fiber stub is a termination end of an optical fiber coupled to the receptacle. In an optical transmitter, a photonic chip in the optical assembly transmits an optical signal into the fiber stub. In an optical receiver, the photonic chip receives an optical signal from the fiber stub. To align the photonic chip and the fiber stub, both the stub and the chip are disposed on the alignment plane established by the optical bench. For example, the fiber stub may be pressed down onto the surface of the optical bench such that an optical path on which the optical signal travels through the stub is parallel with the alignment plane. Similarly, a surface of the photonic chip can contact the surface of the optical bench that defines the alignment plane. Because the photonic chip may be made from a semiconductor material (e.g., silicon) and can be fabricated using precise manufacturing techniques, the thickness of the photonic chip can be tightly controlled so that a lens in the photonic chip can be aligned with the optical path in the fiber stub. Stated differently, by aligning both the fiber stub and the photonic chip to the alignment plane, the stub and chip are aligned in at least one axis such that optical signals can be transmitted between the two components.

In one embodiment, the optical bench may include an aperture through which the fiber stub can be inserted before being aligned to the alignment plane. For example, the optical bench may be L-shaped where a first side of the bench establishes the alignment plane and a second side (which is perpendicular to the first side) includes the aperture for inserting the fiber stub. Once the fiber stub is aligned to the alignment plane on the first side, the receptacle is fixed to the second side of the optical bench using, for example, a laser weld, solder, or adhesive, thereby maintaining the alignment of the fiber stub with the optical bench.

Figure 1B:
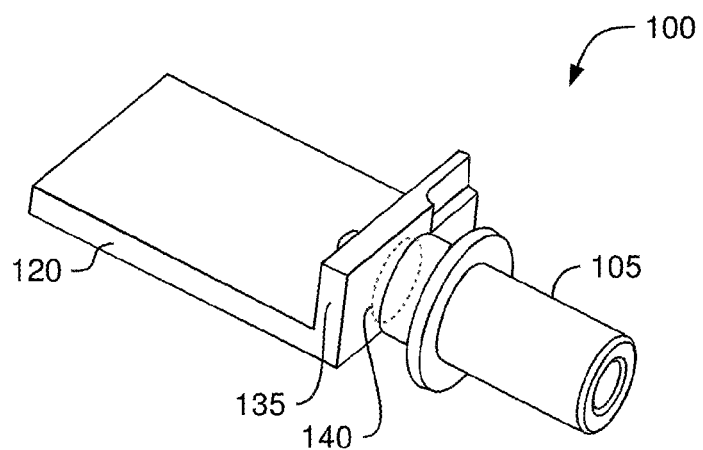

FIGS. 1A and 1B illustrate an optical bench 120 aligned with a receptacle 105, according to embodiments described herein. As shown in FIG. 1A, optical assembly 100 includes receptacle 105 for transmitting or receiving an optical signal. A fiber stub 110 (also referred to as a ferrule) is located at one end of the receptacle 105. The fiber stub 110 includes an optical path 115 located at its center that permits the receptacle 105 to transmit or receive the optical signal. Although not shown, the other end of the receptacle physically contacts a fiber optical cable for transmitting the optical signal to, or receiving the optical signal from, another optical device.

Optical assembly 100 also includes optical bench 120 which is shown here with an L shape. As discussed below, the fiber stub 110 is disposed onto an alignment plane 125 established by a first side 130 of the bench 120. In one embodiment, when aligned, the optical path 115 in the fiber stub is parallel to the alignment plane 125. A second side 135 of the L-shaped optical bench 120 includes an aperture through which the fiber stub 110 is inserted. Put differently, the aperture provides an opening so that the fiber stub 110 can be disposed onto the surface corresponding to the alignment plane 125. In one embodiment, the aperture may have a similar diameter as the fiber stub 110 such that when the stub 110 is inserted into the aperture they fit snugly together and the walls of the aperture provide mechanical support to the stub 110. Alternatively, the diameter of the stub 110 may be smaller than the diameter of the aperture where there is substantial clearance between an outer wall of the stub 110 and the wall forming the aperture. In this example, the clearance (e.g., a gap) may be backfilled to provide additional mechanical support once the fiber stub 110 is aligned.

FIG. 1B illustrates a different perspective of assembly 100 than the perspective provided in FIG. 1A. This view illustrates an interface between the receptacle 105 and the optical bench 120. Specifically, the receptacle 105 contacts the second side 135. To attach the receptacle 105 to the second side 135 such that the relative positions between these components remains fixed, the assembly 100 includes connection portion 140. The connection portion 140 may be a weld formed between the receptacle 105 and the optical bench 120, solder, or epoxy used to hold the bench 120 and receptacle 105 in place.

Figure 2:
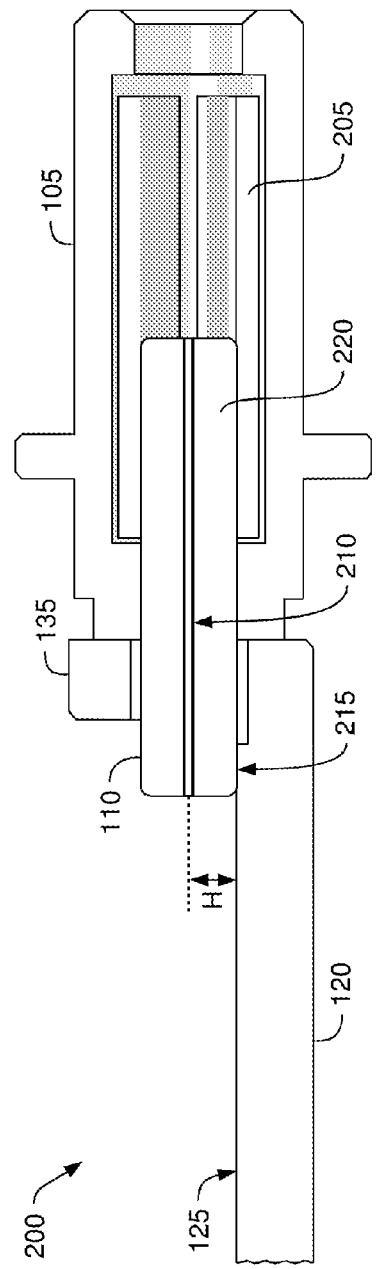
FIG. 2 illustrates aligning a receptacle to an optical bench, according to one embodiment described herein.

FIG. 2 illustrates aligning a receptacle to an optical bench, according to one embodiment described herein. Specifically, optical assembly 200 illustrates a cross section of the receptacle 105 and optical bench 120. Receptacle 105 includes a split sleeve 205 that encapsulates a portion of the fiber stub 110. In one embodiment, the fiber stub 110 establishes a single-mode optical path 210 which carries an optical signal through the stub 110 and receptacle 105.

As shown, an outer shell 215 of the fiber stub 110 contacts the alignment plane 125. In one embodiment, once the fiber stub 110 is inserted into the aperture of the second side 135, the stub 110 is pressed down so that the outer shell 215 directly contacts (i.e., tangentially contacts) the alignment plane 125 of the optical bench 120 at multiple locations. Doing so aligns the optical path 210 such that it is parallel to the alignment plane 125. Once aligned, the receptacle 105 may be attached to the optical bench 120—e.g., the receptacle 105 is welded to side 135. Moreover, the distance between the alignment plane 125 and the optical path 210 is referred to as the optical height (H). If the optical path 210 and alignment plane 125 are parallel, then the optical height remains constant as an optical axis defined by the path 210 extends across the plane 125. Thus, for any optical signal traveling along this optical axis (assuming the optical signal does not spread) will be located at the same height relative to the alignment plane 125 as the signal travels out of the fiber stub 110 and towards the left side of the optical bench 120, and vice versa.

Although FIGS. 1A-1B and 2 illustrate an L-shaped optical bench 120, other shapes are possible. In other embodiments, the optical bench 120 may include only the first side 135 that defines the alignment plane 125, or include more than the two sides shown in the figures. For example, the second side 135 that defines the aperture may be omitted from the optical bench 120. Alternatively, instead of the second side 135 being part of the optical bench 120, this side 135 may be part of the receptacle 105. In that case, the leftmost surface of the second side 135 may be welded onto the rightmost surface of the bottom side 130. In another embodiment, instead of (or in addition to) connecting the receptacle 105 to the optical bench 120 at the connection portion 140, the two components may be connected where the fiber stub 110 contacts the alignment plane 125.

In one embodiment, aligning the fiber stub 110 to the alignment plane 125 of the optical bench 120 aids the assembly 200 to satisfy Fiber Optic Connector Intermateability Standards (FOCIS). In these standards, an optical port needs to be positioned with +/−50 microns relative to a mechanical reference plane. That is, the misalignment from where the optical signal exits the fiber stub 110 and is received by an optical component in the assembly 200 cannot exceed −/−50 microns. However, as mentioned above, without having tangential contact between fiber stub 110 and the L-shaped optical bench 120 and without having high enough precision parts (like the fiber stub with +/−1 um OD control) total tolerance stackup (>50 um) forces one to use thermal pads to absorb those large tolerances to stay within FOCIS. In contrast, the embodiments described herein may not use the thermal pads (also referred to as alignment pads), and thus, can satisfy the FOCIS standard without the downside of using thermal pads which includes unbalanced forces and reduced heat transfer since thermal pad thickness needs to be substantial (e.g., 500 um or more). Also, by not using thermal pads, the optical assembly may be less expensive and can have improved thermal performance which is discussed later.

Figure 3:
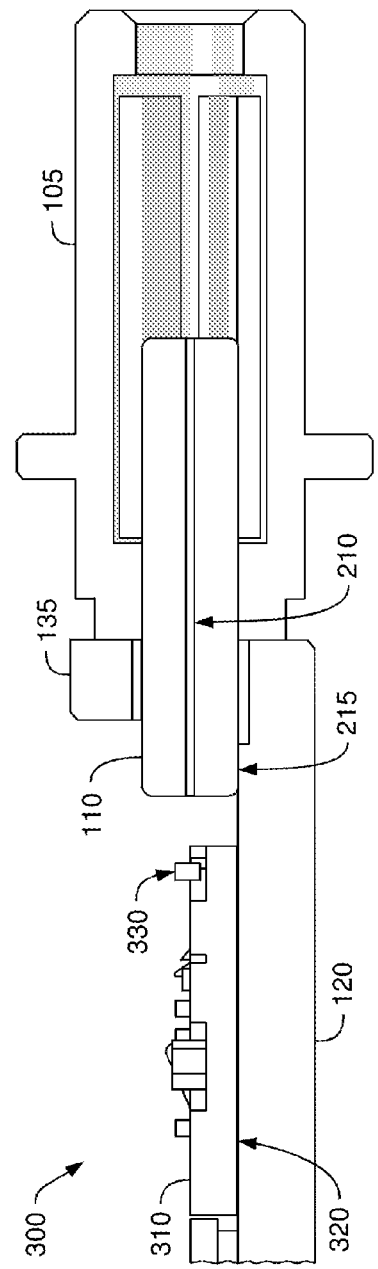
FIG. 3 illustrates aligning a receptacle to a photonic chip on the optical bench, according to one embodiment described herein.

FIG. 3 illustrates aligning the receptacle 105 to a photonic chip 310 on the optical bench 120, according to one embodiment described herein. In assembly 300, the photonic chip 310 is aligned to the alignment plane of the optical bench 120. To do so, the photonic chip 310 includes a bottom surface 320 that directly contacts the surface of the optical bench 120 that defines the alignment plane. As shown, chip 310 and fiber stub 110 both contact the same surface of the optical bench (i.e., both are aligned to the alignment plane). For example, the bottom surface 320 and the outer shell 215 both contact this surface at several locations.

In one embodiment, the photonic chip is made of a material where the thickness (or height) of the chip 310 can be tightly controlled—e.g., a semiconductor material such as silicon, geranium, gallium arsenide, and the like. For example, a semiconductor photonic chip may be fabricated using techniques where the thickness of the chip 310 is within tight tolerances—e.g., less than −/+5 microns. Similarly, the diameter of the fiber stub 110 as well as the distance between the optical path 210 and the outer shell 215 may be within tight tolerance—e.g., less than −/+5 microns. The thickness of the optical bench 120 can also be controlled within −/+15 microns. Thus, even if the variations in the process used to fabricate the fiber stub 110, the photonic chip 310, and the optical bench 120 reach the extreme values of these tolerances, the stack height difference between the stub 110 and a bottom surface of the optical bench 120 (i.e., the side opposite the alignment surface) will still be well within a limit that allows FOCIS compliance for a final finished transceiver assembly (i.e., −/+50 micron limit). A sufficient tolerance for mounting assembly 200 directly into transceiver is +/−25 microns. Mounting the assembly 200 in a transceiver fixes the center of the fiber stub 110 within the transceiver port. FOCIS allows a +/−50 micron variation for the center of the fiber stub 110 within transceiver port, measured off of the center of the transceiver port. With above reasonably assumed tolerance stack one would stay within FOCIS specification.

To optically couple the photonic chip 310 to fiber stub 110, the chip 310 includes a lens 330 that is aligned to the optical path 210. In one embodiment, the photonic chip 310 includes an optical component (e.g., one or more waveguides, light source, or photodiode) that receives an optical signal from, or transmit an optical signal to, the fiber stub 110 via the lens 330. Because the thicknesses of the chip 310 and stub 110 are tightly controlled, these waveguides can be passively aligned to the optical path 210 (at least in the height direction) when the photonic chip 310 is disposed on the bench 120. Put differently, because the outer shell 215 of the stub 110 and bottom surface 320 of the chip 310 contact the same surface, the optical component in the chip 310 is at the same optical height as the optical path 210 without requiring a technician to actively align the components by transmitting light from the stub 110 to the chip 310 in order to ensure the optical component in the chip 310 is at the same height as the optical path 210 (within an acceptable tolerance). In one embodiment, precision (active) alignment may be used to align the lens 330 once the photonic chip 310 and fiber stub 110 are disposed on the optical bench 120.

Although FIG. 3 illustrates that chip 310 directly contacts the alignment plane on the optical bench, in other embodiments there may be a spacer or substrate between the photonic chip 310 and the optical bench 120 such that the chip 310 does not directly contact the optical bench 120. Nonetheless, the thickness of the space and the photonic chip 310 may be tightly controlled such that an optical component on the chip 310 is passively aligned in the height direction with the optical path 210.

Figure 4:
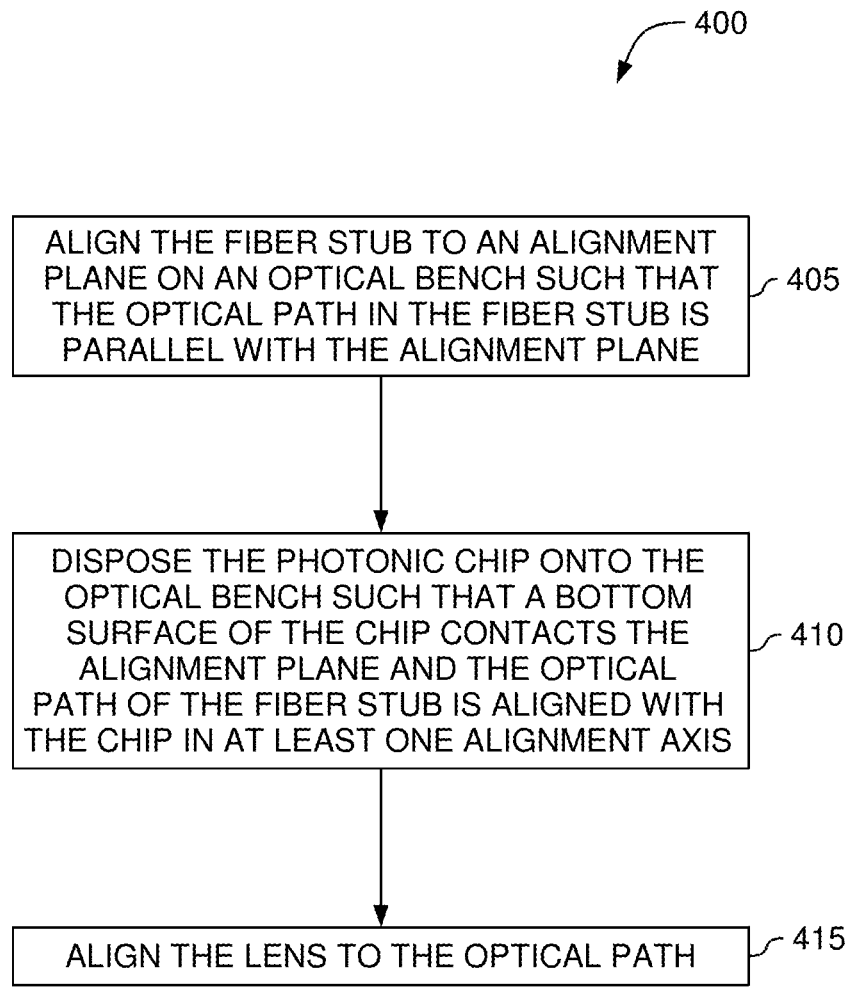
FIG. 4 is a method for aligning a receptacle and a photonic chip on an optical bench, according to one embodiment described herein.

FIG. 4 is a method 400 for aligning a receptacle and a photonic chip on an optical bench, according to one embodiment described herein. At block 405, the fiber stub is aligned to the alignment plane defined by the optical bench such that the optical path in the fiber stub is parallel with the alignment plane. In one embodiment, a technician or machine presses down on the fiber stub so that the outer shell of the stub makes tangential contact with the optical bench. Once the tangential contact is established, the optical bench is attached to the receptacle containing the fiber stub to maintain the alignment between the stub and the optical bench.

In one embodiment, as shown in the FIGS. 1-3, the optical bench is L-shaped where a first side defines the alignment plane and a second side, which is perpendicular to the first side, provides a surface for coupling the receptacle to the optical bench. However, in other embodiments, the optical bench may include only the first side, or include more than the two sides shown in the figures.

At block 410, the optical chip is disposed onto the optical bench such that a bottom surface of the chip contacts the alignment plane. By doing so, the optical path of the fiber stub is aligned with the photonic chip in at least one alignment axis (i.e., in the height direction). Put differently, the thickness of the photonic chip and fiber stub may be controlled such that when these components contact the common surface in the optical bench, different parts of the components are aligned. For example, the fiber stub includes the optical path through its center, while the photonic chip includes a top surface that may include an optical component such as a waveguide. When disposed on the optical bench, the optical path and the top surface of the chip are aligned—i.e., have the same height in a direction perpendicular to the alignment plane established by the optical bench.

In one embodiment, the optical bench may include other alignment features that align the photonic chip to the fiber stub such as markings in the alignment plane of the optical bench or alignment stops formed on the optical bench. However, in other embodiments, the alignment of the chip and the fiber stub in other alignment axes (e.g., in a direction into the page as shown in FIGS. 2 and 3) may be performed when aligning the lens between the photonic chip and the fiber stub.

At block 415, the lens is aligned to the optical axis defined by the optical path in the fiber stub. As shown in FIG. 3, the lens 330 is located on the photonic chip. The lens may be used to focus light received from the fiber stub into an optical component in the photonic chip, or to focus light received from the optical component on the chip (e.g., an output of a laser or waveguide) into the fiber stub. That is, the optical assembly shown in FIG. 3 may be used as either a transmitter or a receiver. In either case, a technician may actively align the lens such that an optical signal is efficiently transmitted between the photonic chip and the fiber stub. In one embodiment, the technician may move the position of the lens relative to the photonic chip. Stated differently, the technician may keep the positions of the photonic chip and fiber stub fixed while moving the position of the lens on the photonic chip. Once the measured signal reaches a threshold, the technician fixes the lens to the photonic chip using, e.g., an epoxy. Alternatively, the lens may be fixed onto the photonic chip and the technician may slide or rotate the photonic chip on the optical bench to change the lateral location of the photonic chip relative to the fiber stub. Once the measured test signal reaches a threshold, the technician fixes the photonic chip onto the optical bench.

In another embodiment, the assembly may include a lens that is not located on the photonic chip or the fiber stub. In this example, the lens may be a separate component disposed on the optical bench. Once the locations of the photonic chip and fiber stub are fixed on the optical bench (which could be done passively), the technician may dispose and then align the lens on the optical bench (which may be done using active alignment). In this case, the lens on the photonic chip may be omitted, or alternatively, the assembly may use both lenses in order to transfer light between the chip and the fiber stub.

In one embodiment, once the lens, photonic chip, and fiber stub are aligned, the total tolerance of the stack from the bottom surface of the optical bench contacting the transceivers shell (i.e., the side opposite the alignment surface) to the optical axis defined by fiber stub is within a range that still leaves additional placement margin within transceiver shell before the FOCIS allowable tolerance range of +/−50 microns would be exceeded. The mounting is the direct placement of L-plate optical bench onto a reference surface within transceiver shell without using compliant materials (thermal pads). In one embodiment, the tolerance of the stack (depending on the particular material and fabrication techniques used) may be within +/−20 microns.

FIG. 5 is an optical transmitter 500 that includes an optical bench, according to one embodiment described herein. Although the following embodiments discuss an optical transmitter, the same principles may also be used in an optical receiver.

The photonic chip 310 includes lasers 530A-D which each output a respective continuous wave (CW) optical signal. Although not shown, the photonic chip 310 may include respective modulators that modulate the CW optical signals using control signals to embed data into the optical signal. The optical signals may then be combined into a single optical signal using, e.g., a Mach-Zehnder multiplexer, and then outputted to the lens 330. The lens 330 focuses and retransmits the signal into the fiber stub 110. In one embodiment, each laser 530 and corresponding modulator pair may form a channel of the multiplexed signal that is transmitted to the fiber stub 110. Thus, in this example, the transmitter 500 transmits a four-channel optical signal, but in other embodiments the transmitter 500 may provide any number of channels, e.g., a two-channel or six-channel optical signals.

To generate the channels, the photonic signal may use electrical signals received from an electrical IC 520 to control the modulators. The transmitter 500 may include wire leads or solder bumps that connect the electrical IC 520 to the photonic chip 310. Using these electrical connections, the electrical IC 520 can provide the control signals (or data signals) for modulating the CW signals generated by the lasers 530. Moreover, the electrical IC 520 is coupled to a flex printed circuit board (PCB) 510 which serves as a high-speed data bus between the transmitter 500 and a computing device (e.g., a server). The transmitter 500 may also use wires or solder bumps to electrically couple the electrical IC 520 to the flex PCB 510. In one embodiment, the data signals transmitted by a first computing device using the PCB 510 are received at the electrical IC 520 which in turn uses the data signal to generate control signals. The electrical IC 520 transmits the control signals to the photonic chip 310 which drives the modulators such that the data received via the flex PCB 510 is embedded into the optical signals. For example, the modulators on the photonic chip 310 may control the phase of the optical signal generated by the lasers 530 in order to encode the data provided by the first computing device into the optical signals. The modulated signals are then multiplexed and transmitted via lens 330 into the fiber stub 110 and receptacle 105. An optical fiber (not shown) may transmit the optical signals to a corresponding receiver that may be coupled to a second computing device. The receiver may convert the optical signals back into electrical data signals which are then provided to the second computing device. In this manner, the first and second computing devices can use the optical transmitter and receiver to share data.

FIG. 6 is an optical transmitter 600 with a thermal connection between the optical bench 120 and an outer casing 610 which defines the form factor of the transmitter 600, according to one embodiment described herein. As shown, the receptacle 105 and fiber stub 110 are attached to the optical bench 120. However, in contrast to the previous views, the arrangement of these components is inverted such that the fiber stub 110 and the photonic chip 310 are coupled to a bottom side of the optical bench 120. Moreover, the transmitter 600 includes a lid 620 that lays between the optical bench 120/photonic IC 310 and the bottom portion of the casing 610. The lid 620 may attach to the optical bench 120 to provide additional protection for the photonic IC 310.

In one embodiment, the transmitter 600 is a Quad Small Form-factor Pluggable (QSFP) transmitter which is a compact, hot-pluggable device that may interface networking hardware to fiber optic cable. In another embodiment, the transmitter 600 is a QSFP+ transmitter or a Small Form-factor Pluggable (SFP) transmitter.

The transmitter 600 includes a thermal interface 630 between the optical bench 120 and the outer casing 610. In one embodiment, the thermal interface 630 may be a direct connection between the casing 610 and the optical bench 120. For example, both the casing 610 and the optical bench 120 may be formed from metal, which when in contact, form the thermal interface 630. Alternatively, the thermal interface 630 may include a thin (e.g., less than 25 microns) thermally conductive epoxy, adhesive, or grease that is between the casing 610 and bench 120. The thermal material may improve the thermal coupling between these components. In another embodiment, solder may be used to couple the optical bench 120 to the casing 610.

Regardless of the technique used to thermally couple these components, the thermal interface 630 may provide a better interface for dispersing thermal energy as shown by arrows 640 relative to an optical device that includes a thermal pad between the casing 610 and the photonic chip 310. For example, because the optical bench 120 provides a common alignment plane for aligning the photonic chip 310 to the fiber stub 110, a thermal pad is not needed in order to absorb excessive misalignment between these components. Because the optical bench 120 may have a higher thermal conductivity than a thermal pad, the transmitter 600 can dissipate the heat generated by lasers on the photonic chip 310, the electrical IC, fiber stub 110, and the like with improved efficiency. Moreover, the material of the optical bench 120 may be selected to be both rigid and have a high thermal conductivity (e.g., ceramic, ceramic compounds, metals that include iron, or copper alloys).

In one embodiment, the thermal interface 630 may have a thickness that is substantially zero. That is, even if the interface 630 includes a thin layer of epoxy or solder separating the casing 610 and optical bench 120 (e.g., less than 25 microns), the casing 610 and optical bench 120 are still considered as forming a direct connection at the interface 630. This is in contrast to when a thermal pad is present which may have a thickness that is greater than 500 microns. Moreover, the combined thickness of the fiber stub 110 and the optical bench 120 may be within the FOCIS thresholds. For example, the diameter of the fiber stub 110 may have a tolerance of +/−1 micron, while the thickness of the optical bench 120 may have a tolerance of +/−15 microns. Thus, the combined tolerance variation after mounting of both of these components (which can add an additional −/−5 microns) is −/−21 microns (worst case) which is still within the 50 micron tolerance set by FOCIS. However, this is just one advantage of the embodiments described herein, and this disclosure may still apply to optical devices where this advantage is not achieved.

In one embodiment, the casing 610 serves as a heat sink for the transmitter 600. Because the casing 610 may have a large outer surface relative to the size of the optical bench 120, the casing 610 may be ideal for radiating the heat transferred to it by the bench 120 as shown by arrows 640. The casing 610 may be made from a metal with high thermal conductivity so that the heat received from the optical bench 120 can spread out across the surface area of the casing 610. As above, the outermost surface of the casing 610 may define the form factor of the transmitter 600. In one example, this surface may be used to radiate the heat received from the casing 610 into the environment surrounding the transmitter 600.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical device, comprising:
    an optical bench comprising a single-plane surface defining an alignment plane;
    a fiber stub comprising an optical path configured to transmit an optical signal, wherein the fiber stub contacts the single-plane surface such that the optical path is parallel with the alignment plane; and
    a photonic chip disposed on the single-plane surface, the photonic chip comprising an optical lens aligned with the optical path of the fiber stub, wherein the fiber stub is configured to transmit the optical signal in free space to the optical lens, wherein the optical lens is disposed on a first side of the photonic chip that is opposite a second side of the photonic chip facing the optical bench.

2. The optical device of claim 1, wherein the optical bench comprises a first side and a second side, wherein the first side of the optical bench comprises the single-plane surface that defines the alignment plane, and wherein the first and second sides of the optical bench form an L-shape.

3. The optical device of claim 2, further comprising:
    a receptacle that includes the fiber stub, wherein the receptacle is attached to the second side of the optical bench using a connecting portion.

4. The optical device of claim 2, wherein the second side defines an aperture, wherein the fiber stub extends though the aperture in order to contact the single-plane surface located on the first side of the optical bench.

5. The optical device of claim 1, wherein a first height of the optical path relative to the alignment plane is the same as a second height of an optical component in the photonic chip relative to the alignment plane.

6. The optical device of claim 1, wherein the photonic chip directly contacts the single-plane surface of the optical bench.

7. The optical device of claim 1, further comprising:
    a casing defining a form factor of the optical device, wherein the optical bench contacts the casing at a thermal interface so that heat radiates from the optical bench to the casing.

8. The optical device of claim 7, wherein a thermal pad is not located between the optical bench and the casing at the thermal interface.

9. A method, comprising:
    aligning a fiber stub to an alignment plane by disposing the fiber stub onto a single-plane surface of an optical bench, wherein an optical path in the fiber stub for transmitting an optical signal is parallel with the alignment plane; and
    disposing a photonic chip onto the single-plane surface of the optical bench such that the optical path of the fiber stub is aligned with an optical lens in the photonic chip so that the optical signal emitted by the fiber stub travels through free space to reach the optical lens, wherein the optical lens is disposed on a first side of the photonic chip that is opposite a second side of the photonic chip facing the optical bench.

10. The method of claim 9, wherein the optical bench comprises a first side and a second side, wherein the first side of the optical bench comprises the single-plane surface that defines the alignment plane, and wherein the first and second sides of the optical bench form an L-shape.

11. The method of claim 10, further comprising:
    attaching a receptacle comprising the fiber stub to the second side of the optical bench using a connecting portion.

12. The method of claim 10, wherein aligning the fiber stub to the alignment plane further comprises:
    inserting the fiber stub through an aperture in the second side in order to contact the single-plane surface located on the first side of the optical bench.

13. The method of claim 9, wherein both the fiber stub and the photonic chip directly contact the single-plane surface along the alignment plane.

14. The method of claim 9, wherein aligning the fiber stub to the alignment plane further comprises:
    applying pressure to the fiber stub to ensure tangential contact between the fiber stub and the single-plane surface in the alignment plane.

15. The method of claim 9, further comprising:
    after aligning the fiber stub and disposing the photonic chip, actively aligning a lens that is between an optical component and the optical path in the fiber stub.

16. An optical device, comprising:
    an optical bench comprising a single-plane surface defining an alignment plane;
    a fiber stub comprising an optical path configured to transmit an optical signal in free space to reach a lens, wherein the fiber stub is in tangential contact with the single-plane surface; and a semiconductor chip disposed on the single-plane surface, wherein the semiconductor chip comprises the lens that is aligned with the optical path in the fiber stub.

17. The optical device of claim 16, wherein the optical bench comprises a first side and a second side, wherein the first side of the optical bench comprises the single-plane surface that defines the alignment plane, and wherein the first and second sides of the optical bench form an L-shape.

18. The optical device of claim 16, wherein an optical component is disposed on a first side of the semiconductor chip that is opposite a second side of the semiconductor chip that faces the optical bench, wherein the semiconductor chip directly contacts the single-plane surface.

19. The optical device of claim 16, further comprising:
a casing defining a form factor of the optical device, wherein the optical bench contacts the casing at a thermal interface so that heat radiates from the optical bench to the casing.

20. The optical device of claim 1, wherein the optical bench is metallic, wherein the photonic chip directly contacts the single-plane surface of the optical bench.

\* \* \* \* \*

UNITED STATES PATENT AND TRADEMARK OFFICE
CERTIFICATE OF CORRECTION

PATENT NO. : 9,921,378 B2  
APPLICATION NO. : 14/689952  
DATED : March 20, 2018  
INVENTOR(S) : Stefan Martin Pfnuer et al.

It is certified that error appears in the above-identified patent and that said Letters Patent is hereby corrected as shown below:

On the Title Page

In item (57), in Column 2, in "Abstract", Line 1, after "used" insert -- to --.

In the Specification

In Column 1, Line 14, delete "submout" and insert -- submount --, therefor.

In Column 2, Line 26, after "used" insert -- to --.

In Column 4, Line 42, delete "-/-50" and insert -- +/-50 --, therefor.

In Column 8, Line 67, delete "-/-5" and insert -- +/-5 --, therefor.

In Column 9, Line 1, delete "-/-21" and insert -- +/-21 --, therefor.

Signed and Sealed this  
Twenty-sixth Day of June, 2018

Andrei Iancu  
*Director of the United States Patent and Trademark Office*